(12) United States Patent
Wober et al.

(10) Patent No.: US 6,658,169 B1
(45) Date of Patent: Dec. 2, 2003

(54) IMAGE PROCESSOR WITH INTEGRAL IMAGE BUFFER

(75) Inventors: Munib A. Wober, Wakefield, MA (US); William D. Washkurak, Acton, MA (US); James R. Toker, Cambridge, MA (US)

(73) Assignee: Imaging Devices, Inc., Burlington, MA (US)

( * ) Notice: Subject to any disclaimer, the term of this patent is extended or adjusted under 35 U.S.C. 154(b) by 635 days.

(21) Appl. No.: 09/642,301

(22) Filed: Aug. 21, 2000

(51) Int. Cl.[7] ............................. G06K 9/54; G06K 9/60; G06F 13/18; G06F 13/34
(52) U.S. Cl. ..................... 382/307; 711/151; 711/158
(58) Field of Search ................. 382/307; 712/1–43; 714/9, 10–57; 711/151, 158

(56) References Cited

U.S. PATENT DOCUMENTS

| | | | |
|---|---|---|---|
| 5,732,236 A | * 3/1998 | Nguyen et al. | 711/151 |
| 5,857,114 A | * 1/1999 | Kim | 710/22 |
| 6,029,238 A | * 2/2000 | Furukawa | 712/1 |
| 6,148,381 A | * 11/2000 | Jotwani | 711/158 |
| 6,288,787 B1 | * 9/2001 | Kim | 358/1.1 |
| 6,289,138 B1 | * 9/2001 | Yip et al. | 382/307 |
| 6,333,745 B1 | * 12/2001 | Shimomura et al. | 345/535 |

OTHER PUBLICATIONS

King–Sun Chan, "A refined model for performance analysis of buffered banyan networks with and without priority control", IEEE 1997, p. 1745–1750 vol. 3.*

Yih–Yan Chao, "Real time image transfer on high speed local area network", IEEE 1990, p. 816–820 vol. 2.*

* cited by examiner

*Primary Examiner*—Samir Ahmed
*Assistant Examiner*—Brian Le
(74) *Attorney, Agent, or Firm*—Altman & Martin (57) ABSTRACT

An imaging processor microcircuit incorporating an integral image buffer, preferably a synchronous random-access memory device. Access to the image buffer is controlled by an image buffer access prioritizer. When the prioritizer detects that a device desires image buffer access, it signals all lower-priority devices to suspend accesses until the higher-priority device has completed access. An image sensor interface transfers image sensor data to the image buffer. As each pixel data is read, it is modified by reference data read from the image buffer then stored in the image buffer. The read, modify, write process takes three of a possible five cycles, leaving two unused cycles for image buffer access by other devices. The image buffer is also temporary image storage for an optional LCD and an optional print engine. The LCD interface uses the unused cycles to read LCD image data.

4 Claims, 6 Drawing Sheets

IMAGE PROCESSOR WITH INTEGRAL IMAGE BUFFER

BACKGROUND OF THE INVENTION

1. Field of the Invention

The present invention relates to electronic digital imaging, more particularly, to a digital imaging integrated circuit with integral image buffer and print controller.

2. The Prior Art

Digital imaging is the process of acquiring a digital representation of a visual signal and manipulating the representation for a desired result. The representation is acquired using an array of photosensitive pixels. The analog output of each pixel is read, converted to digital form, and stored in local memory, called an image buffer. The digital data from the image buffer is manipulated to produce the final image and then stored and/or displayed. Two characteristics of the digital image directly affect the size of the image buffer: the number of pixels and the resolution of the analog-to-digital conversion. The number of pixels for inexpensive photographic imaging is typically about 300,000, from a 640×480 pixel array. The digital resolution of each pixels in photographic imaging is typically between 8 and 12 bits. Thus, for the typical color photo image, the image buffer needed to hold the raw data from the photodetector array is about 300 to 450 kilobytes (KB).

Some digital imaging systems, such as electronic cameras, give the user the ability to directly print a hard copy of an image. Currently, this means that most systems have a standard printer port, which can be a serial or parallel port using an appropriate protocol and data format. The port is used to connect to a standalone printer with a standard interface. The internal processor of the system reads data from the image buffer, manipulates it to generate the appropriate data format for the printer, and then transfers data from memory to the printer interface, which, in turn, transmits the data to the printer.

Figure 2:
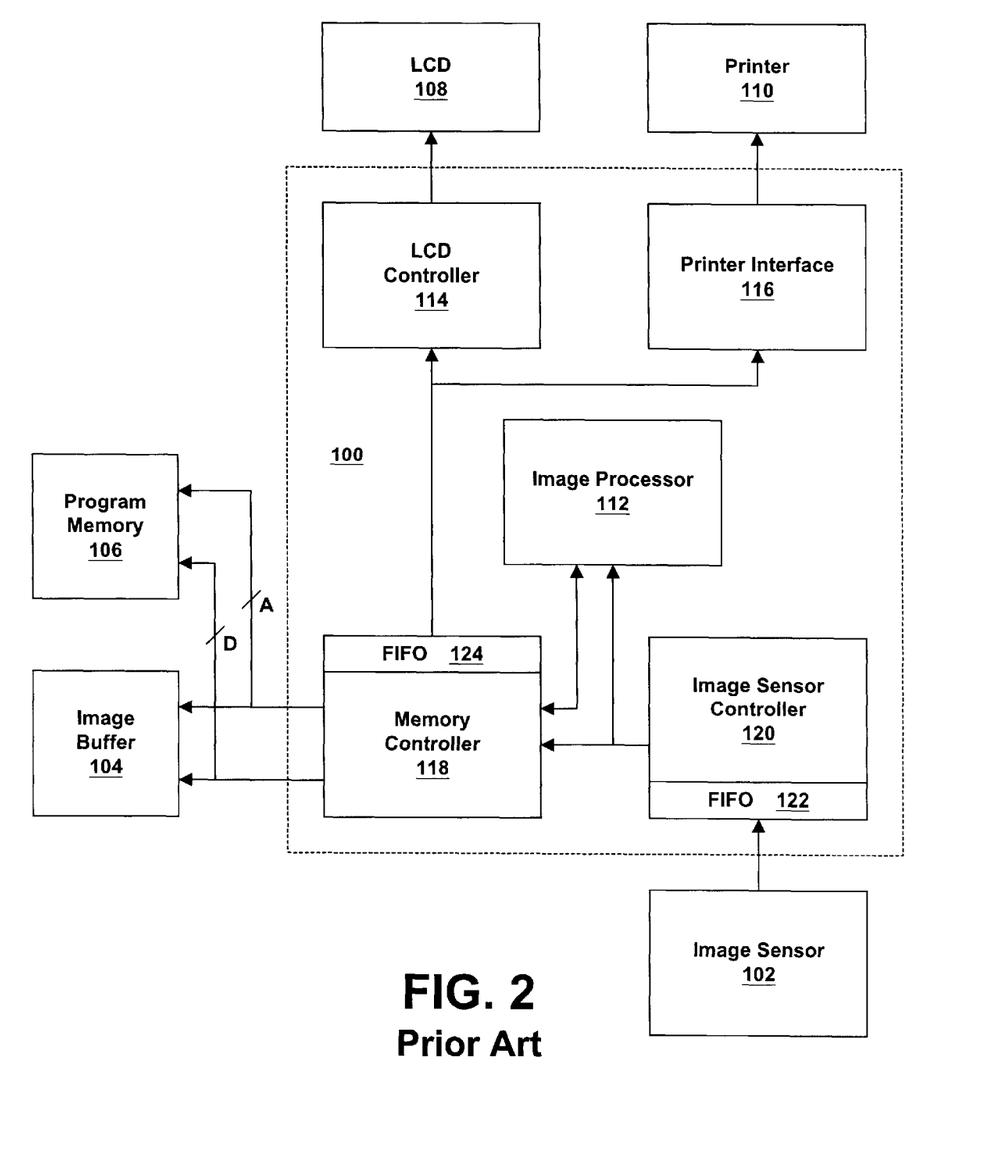
FIG. 2 is a block diagram of a typical prior art imaging system.

A typical prior art system is shown in FIG. 2. Note that the image controller 100 and the image buffer 104 are two independent devices connected by external circuitry. The printer interface 116 has a standardized output that sends data to a standalone printer 110. The main reason for having independent devices like this is historical: the technologies are different enough that companies do not take a integrated system design approach to the creation of imaging systems. More specifically, imaging companies do not design memory devices, memory companies do not design imaging devices, and neither of them design print controllers. The technologies are different enough that companies do not think to try to produce both, and particularly do not think to integrate them into a single device. Consequently, when designing systems for image processing, one had to choose an image processor, add to it general purpose memory devices, and tack on a printer interface.

One additional issue regarding the printer interface is power. There are several basic types of print engines. It is currently not practical to build a laser print engine into a hand-held camera because of their extremely large power requirements. It is also not practical to build an ink-jet print engine into a hand-held camera because it cannot be made small enough, particularly when considering that it needs ink reservoirs. Nor are ink-jet printers immune to changes in orientation, a detriment in any kind of hand-held equipment.

For these reasons and others, thermal print engines are the most practical for designing into hand-held electronic cameras. The main shortcoming of thermal print engines is that, when the heating elements of a thermal printer are activated, the power surge is relatively large. This can cause problems with the camera batteries. Because a hand held camera is small, the batteries are also small and not generally capable of supply large surges of power, at least for very long.

In the system of FIG. 2, image data from the image sensor 102 must pass through the image controller 100 to get to the image buffer 104. Meanwhile, with the Von Neumann architecture shown, the image processor 112 is also performing memory accesses to its program memory 106, causing bus collisions and potentially reducing the speed at which data can be transferred from the image sensor 102 to the image buffer 104. To minimize such problems, the image controller 100 incorporates a high-speed cache, typically in the form of a dual port first-in-first-out (FIFO) memory 122. Image data accumulates in the FIFO 122 as it is received from the image sensor 102, and is transferred to the image buffer 104 as bus time becomes available.

The same bus collision problems occur when reading image data from the image buffer 104. Some processes require data on a periodic basis, for example, the driver 114 for the liquid crystal display (LCD) 108 and/or the printer interface 116. Again, in order to guarantee that data will be available when needed, data is read ahead out of the image buffer 104 into a FIFO 124 within the image controller 100, and the data is taken from the FIFO 124, which is updated as memory access cycles become available.

Thus, moving image data to and from the image buffer requires an extra step, that of needing a cache to make sure that image data is available when needed. Obviously, the more hardware there is in a system, the more complicated the system becomes, and potentially, the less potential there is for operating at faster speeds. Thus, there continues to be a need for an imaging processor that eliminates that extra caching step required by imaging system of the prior art.

SUMMARY OF THE INVENTION

An object of the present invention is to provide a combined image processor and image buffer on a single microcircuit device.

Another object is to provide an integrated image processor in which memory transfers to and from the image buffer are independent of the image processor central processing unit and prioritized by need.

The basis of the image processor microcircuit (IP) of the present invention is that the combination of an image processing microcircuit with an external image buffer operates too slowly for most practical uses unless the image processor has an internal means for caching data from the image buffer. And the addition of an on-board cache greatly complicates the design and operation of such an image processor. The present invention integrates the image buffer with the typical image processor functions described above, in effect avoiding the speed problems inherent with an external buffer and the complications associated with an internal cache.

The main components of the IP of the present invention are a central processing unit (CPU) with program memory, an image buffer (IB), an image buffer access prioritizer (IBAP), an image sensor interface (ISI), and a host interface. Optionally, there are a liquid crystal display interface (LCDI), a print controller (PC), and a general purpose communications interface (GPCI). The CPU provides general processing functions, and has separate program and data buses. The host interface provides communications between the IP and any master device. The GPC interface provides communications between the IP and any other external device.

The preferred image buffer is a synchronous random-access memory device (SRAM) having a minimum size of P×N, where P is number of pixels in the image sensor used with the IP and N is the number of bits for each pixel. Access to the IB is controlled by the IBAP, which determines which internal device is to be given access to the IB at any given time. The internal devices, in order of priority, include the LCDI, ISI, PC, and CPU. All input control signals from these devices to the IB, particularly the read and write enable signals, pass through the IBAP. The IBAP outputs prioritization signals to the various devices, in the form of a BUSY signal. When a device senses that its BUSY signal is asserted (active), it delays any accesses to the IB that are not currently in progress. The IBAP asserts the BUSY signals of lower priority devices after sensing that a device wants access to the IB. After the higher-priority device has completed access, the BUSY signals are deasserted.

The ISI reads image data from the IS and writes it to the IB. The particular IS of this implementation provides a 12-bit digital value to represent the analog value from a pixel. Pixels are read from the IS one line at a time. The CPU sets up the IS and ISI before each line, including the IB address where the line of image data is to be stored and the IB address where reference data can be found. As each pixel of data is read from the IS, the ISI has the ability to add or subtract a reference value from the IB to the pixel data and store the modified pixel data in the IB. Typically, this capability is used to subtract pixel noise data as the image is being read.

After the IS and ISI are set up, the CPU initiates the line read. In the present implementation, data is transferred from the IS at 20% of the ISI internal clock rate. Thus, there are 5 internal ISI cycles for each pixel data transfer. In cycle 1, the pixel data and reference data are read. In cycle 2, the reference data is added or subtracted from the pixel data, if the calculation is enabled. In cycle 3, the result is written to the IB. If the pixel is that last of the line, the ISI generates an interrupt to the CPU. If it is not the last line of the image, the CPU sets up the next line and continues.

Note that only 3 of the 5 internal cycles are used by the ISI, which means that two cycles are available for the LCDI, PC, and CPU to access the IB.

The IB is also used as temporary storage for the LCD image data, which is generated by the CPU. The LCDI controls the LCD and transfers data directly from the IB to LCD without going through the CPU. The CPU sets the IB address where the LCD data is located, then starts the LCDI. The LCDI starts reading at the address and, when complete, starts over again, until halted by the CPU. As currently implemented, the LCDI needs to access the IB about once every 3 pixel data transfers, and uses one of the two extra ISI cycles to do so.

The IB is also used as temporary storage for the print image data, which is generated by the CPU. The present invention uses a thermal print engine that has a row of heating elements, one for each pixel of an image row. An image pixel is generated on the paper by heating a spot for a period of time, the length of which determines how dark the spot is. The current implementation allocates 8 bits of data for each pixel of the print image. This means that the heating element may be activated for a heating period that is from 0 to $255/256$ths of the maximum heating time, in increments of $1/256$. The increment is denoted a time slice.

Typically, the maximum heating time can range from about 1 ms to about 100 ms.

The heating elements are driven by latches, one for each heating element, and the latches set from a shift register that has a location for each latch.

The print engine is controlled by the PC. The process by which the PC determines how long a heating element is to remain on is an iterative process. Each pixel data is compared 256 times to a threshold value that starts at 0 and increments after each comparison. If the pixel data is greater than the threshold value, the corresponding latch is set high. Otherwise it is set low.

In implementation, each pixel of a line is compared to the same threshold value and the result is clocked into a shift register that has a position for each pixel of the line. After all pixels of the line have been compared to the same threshold value, the shift register is clocked into the latches and the output of the latches is strobed to turn on the heating elements. The length of the strobe is the same as a time slice. During the time slice, the same line of pixels is compared to the threshold value that has been incremented by one. This continues for all 256 increments of the threshold value. After the line is complete, the CPU instructs the print engine to advance the paper one line, and the process starts again with the next line of pixels.

One aspect of the present invention is the power-saving manner in which the heating elements are activated. The heating elements require a relatively large surge of power when first applied, which is a detrimental to the small batteries typically used in an electronic camera. Consequently, the line of pixels is divided into smaller sets. Each set goes through the complete 256-level threshold comparison before the next set. Thus, only a portion of the heating elements are activated at one time, greatly reducing the power surge on the batteries.

Other objects of the present invention will become apparent in light of the following drawings and detailed description of the invention.

BRIEF DESCRIPTION OF THE DRAWINGS

For a fuller understanding of the nature and object of the present invention, reference is made to the accompanying drawings, wherein.

DETAILED DESCRIPTION

Figure 3:
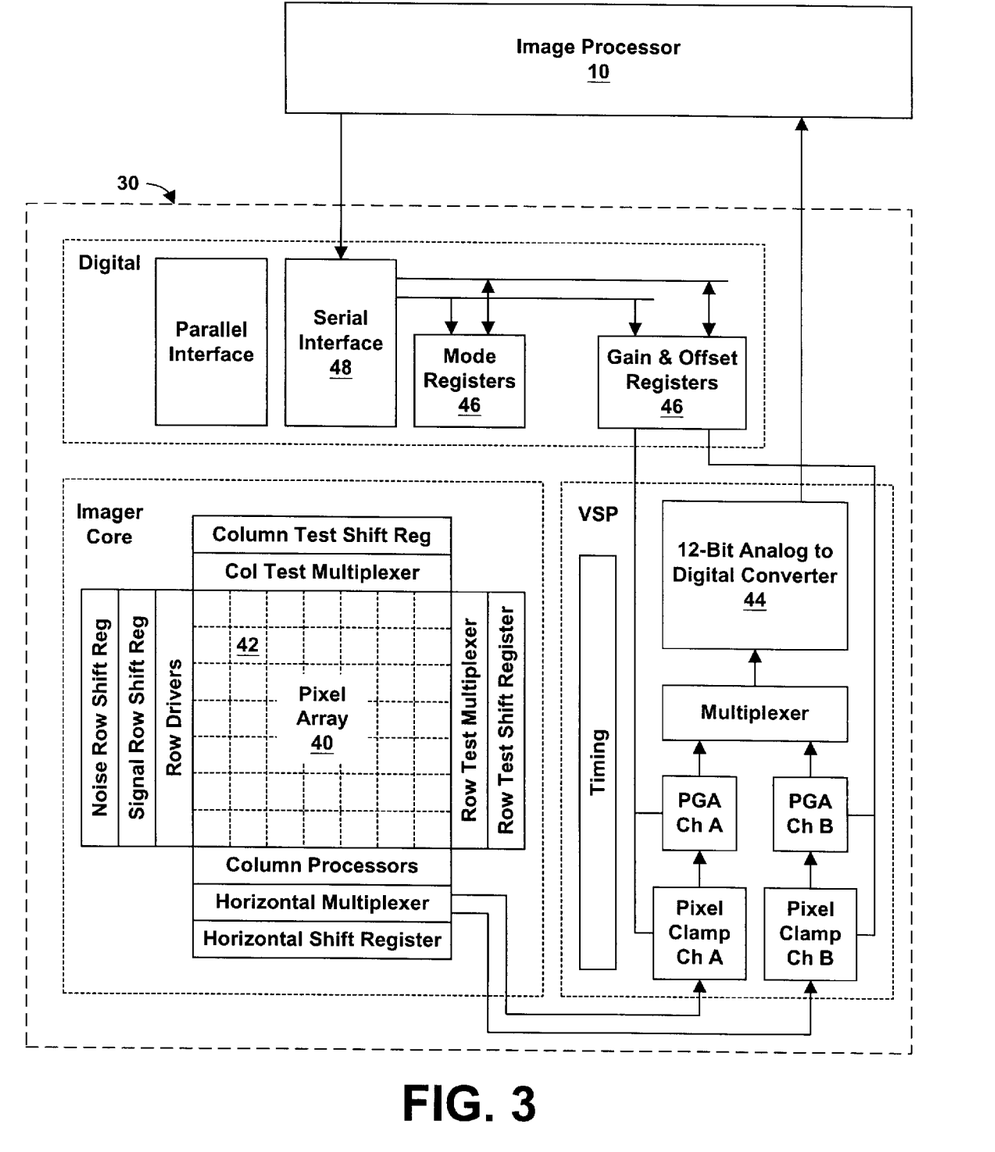
FIG. 3 is a block diagram of a typical image sensor for use with the image processor of the present invention.

The image processor microcircuit (IP) 10 of the present invention is intended for use with an image sensor (IS) 30 that provides a digital output representation of each pixel 42 of the sensor array 40. An example of an IS 30 for use with the present invention is shown in FIG. 3. This IS 30 has an array 40 of 320×240 pixels that are 10 μm×10 μm in size. It uses a Bayer pattern color filter array, that is, 25% of the pixels are for red, 25% of the pixels are for blue, and the remaining 50% of the pixels are for green. The IS 30 has an integral 12-bit analog-to-digital converter (ADC) 44 that converts the analog signal from each pixel 42 into the digital signal, 12 bits in this example, needed by the image processor 10. The IS 30 includes a variety of internal registers 46 accessed by a serial interface 48. The registers 46 control the operation of the IS 30 and are set up and read by the IP 10. Each color output has separate gain and offset control prior to being multiplexed into the ADC. The IS 30 is capable of a 20 MHz pixel data transfer rate.

On command from the IP 10, the pixel array 40 captures the current image and reads it out pixel-by-pixel as a raw analog signal. The signal is amplified and converted to digital data. The image acquisition timing is controlled by a clock received from the IP 10.

The above-described IS 30 is illustrative, and is merely used as a typical source of image data for the remainder of this specification. The IP 10 of the present invention will operate with image sensors having a wide range of parameters. For example, the physical size and number of pixels can vary depending upon the image resolution desired. The ADC resolution can also vary depending upon the desired sensitivity and the sensitivity of the pixels. The color pattern may vary or the image may merely be a gray-scale image.

Figure 1:
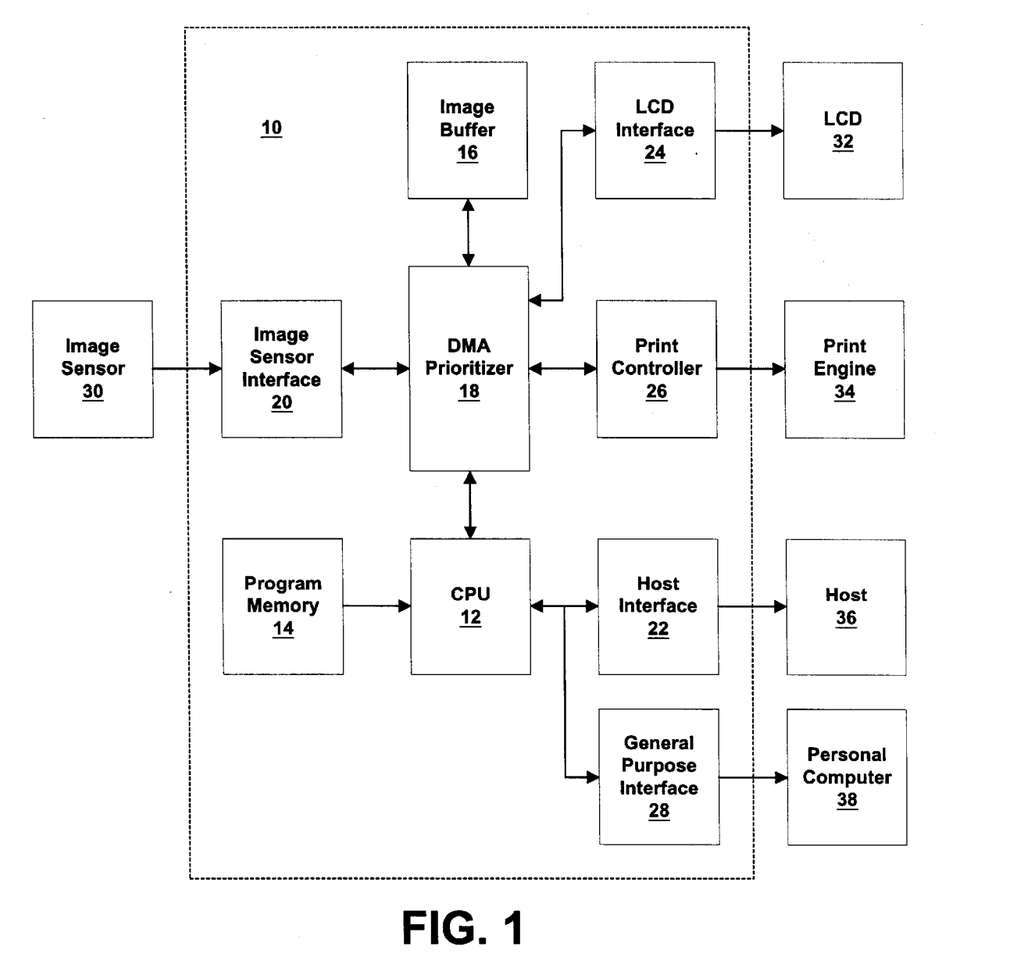
FIG. 1 is a block diagram of the image processor of the present invention.

A basic block diagram of the IP 10 of the present invention is shown in FIG. 1. The main components are a central processing unit (CPU) 12 with program memory 14, an image buffer (IB) 16, an image buffer access prioritizer (IBAP) 18, an image sensor interface (ISI) 20, and a host interface 22. Optional components include a liquid crystal display (LCD) interface (LCDI) 24, a print controller (PC) 26, and a general purpose communications interface (GPCI) 28.

The CPU 12 provides general processing functions for the IP 10. It is designed around a Harvard architecture, that it, it has separate buses for accessing its program memory 14 and its data memory. Its firmware programming resides in the program memory 14 accessed by a read-only program bus.

The host interface 22 provides communications between the IP 10 and any master device 36, such as the main controller of an electronic camera. The GPC interface 28 provides communications between the IP 10 and any other external device, for example, a personal computer 38.

The preferred image buffer 16 is a synchronous random-access memory array (SRAM). The present implementation uses an SRAM of $2^{17}$ 16-bit locations (128 Kwords) or 218 bytes (256 KB). The memory may be addressed as 16-bit words or as 8-bit bytes. The present invention contemplates that the IB 16 may be appropriately sized for the particular application, meaning that the number of memory locations and the size of each location are appropriate for the application. At a minimum, if the IS 30 has P pixels and each pixel is represented by N bits, the IB 16 will have at least P memory locations that are N bits wide. Since the present specification assumes that the IP 10 is receiving its data from the IS 30 described above (76,800 12-bit pixels), a memory size of 128K 16-bit locations is adequate.

The IB 16 has a single port controlled by the IBAP 18 for access by all other devices. The IBAP 18, as its name implies, determines which internal device is to be given access to the IB 16 at any given time. Note that there are a number of internal devices that may need access to the IB 16 during the course of IP 10 operation, including the ISI 20, LCDI 24, PC 26, and CPU 12 are discussed above. Other devices, including the host interface 22 and GPC interface 28, are cited as potentially needing direct access to the IB 16. However, many of these types of devices are read from and written to solely by the CPU 12. In the present implementation, only the ISI 20, LCDI 24, PC 26, and CPU 12 access the IB 16 directly, the other devices are read from and written to only by the CPU 12. The order of IB access priority is the LCDI 24, the ISI 20, the PC 26, and the CPU 12. The reason for this ordering is discussed below with reference to the individual devices.

Figure 4:
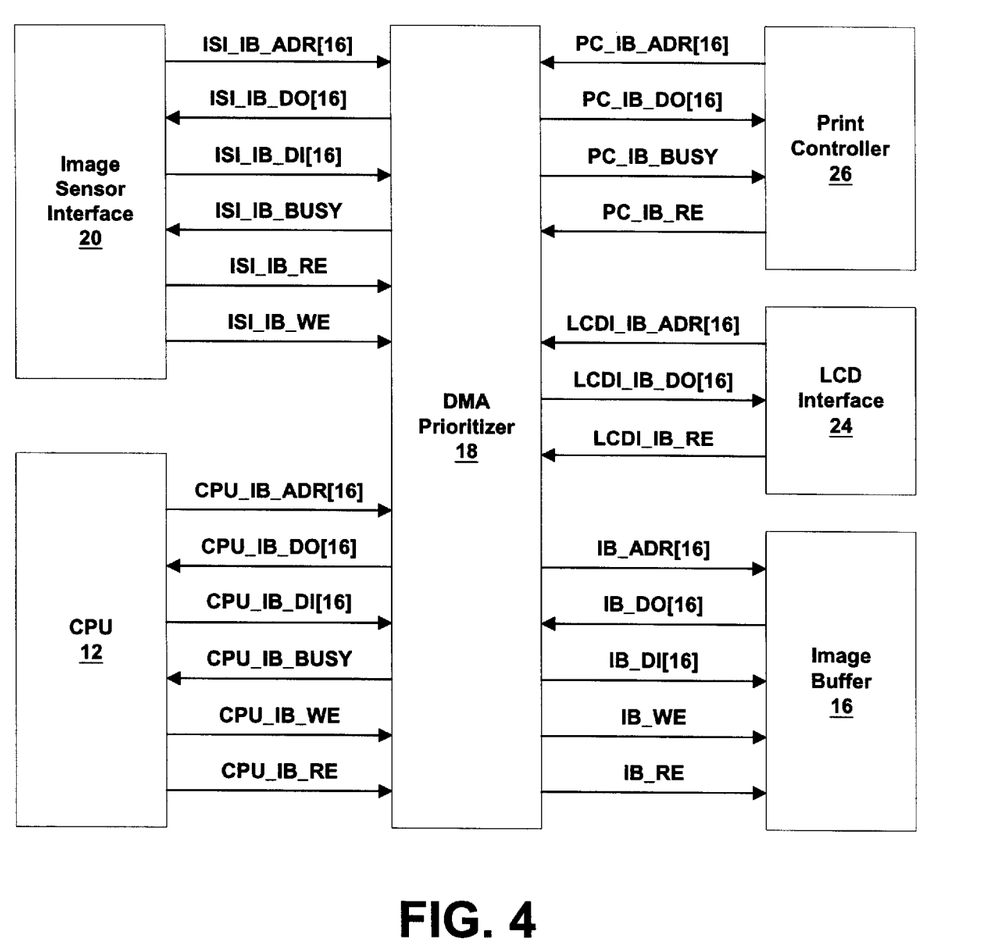
FIG. 4 is a block diagram of the image buffer access prioritizer and adjacent devices.

As shown in the block diagram of FIG. 4, all input signals to the IB 16 pass through the IBAP 18. Like any random access read/write memory, the IB 16 has an address bus, a read enable, and a write enable.

Each device sends a 16-bit address, XXX_IB_ADDR [16], through the IBAP 18 to the IB address bus.

In the present implementation, the IB 16 has both an input data bus, IB_DI[16], and an output data bus, IB_DO[16], both of which are routed through the IBAP 18. In conjunction with the data buses, the read and write enable signal, IB_RE and IB_WE, respectively, are also routed through the IBAP 18. Not all devices use both data buses. For example, the LCDI 24 and PC 26 only access the output data bus and hence only provide a read signal.

The present invention also contemplates that there may be a single bidirectional data bus, rather than independent input and output data buses. The present invention also contemplates that the data buses themselves may not be routed through the IBAP 18. The reason is that, typically, if more than one device can drive a signal, the driver has a high-impedance, or "open", state where it does not drive the signal in order to not interfere with other drivers. If a device is being prevented from access to the IB 16, then it will presumably put its drivers in a high-impedance state. Thus, there would be no need for the IBAP 18 to directly control the data buses.

Finally, there are the prioritization signals from the IBAP 18 to the various devices. These signals include ISI_IB_BUSY, PC_IB_BUSY, and CPU_IB_BUSY. Note that there is no prioritization signal to the LCDI 24, since it has the highest priority, and will not be held off pending access by another device. When a device attempts to access the IB 16, the XXX_IB_BUSY signals to all lower-priority devices are asserted. How the IBAP 18 knows when a device is attempting to access the IB 16 depends on the details of the particular implementation. In general, however, a device is attempting to access the IB 16 when it asserts one of its control signals, either the read enable signal, XXX_IB_RE, or the write enable signal, XXX_IB_WE.

When the LCDI 24 attempts to access the IB 16, the IBAP 18 holds off any accesses by the ISI 20, PC 26, and CPU 12 by asserting ISI_IB_BUSY, PC_IB_BUSY, and CPU_IB_BUSY, and allows the LCDI address, data, and control signals to control the IB address, data, and control signals. When access is complete, the IBAP 18 deasserts ISI_IB_BUSY, PC_IB_BUSY, and CPU_IB_BUSY. Similarly, when the ISI 20 attempts to access the IB 16, the IBAP 18 holds off any accesses by the PC 26 and CPU 12 by asserting PC_IB_BUSY and CPU_IB_BUSY, and allows the ISI address, data, and control signals to control the IB address, data, and control signals. When access is complete, the IBAP 18 deasserts PC_IB_BUSY and CPU_IB_BUSY. Finally, when the PC 26 attempts to access the IB 16, the IBAP 18 holds off any accesses by the CPU 12 by asserting CPU_IB_BUSY, and allows the PC address, data, and control signals to control the IB address, data, and control signals. When access is complete, the IBAP 18 deasserts CPU_IB_BUSY. A timing diagram showing how the PC 26 is suspended from IB access when a higher priority device is accessing the IB 16 is shown in FIG. 5.

Figure 5:
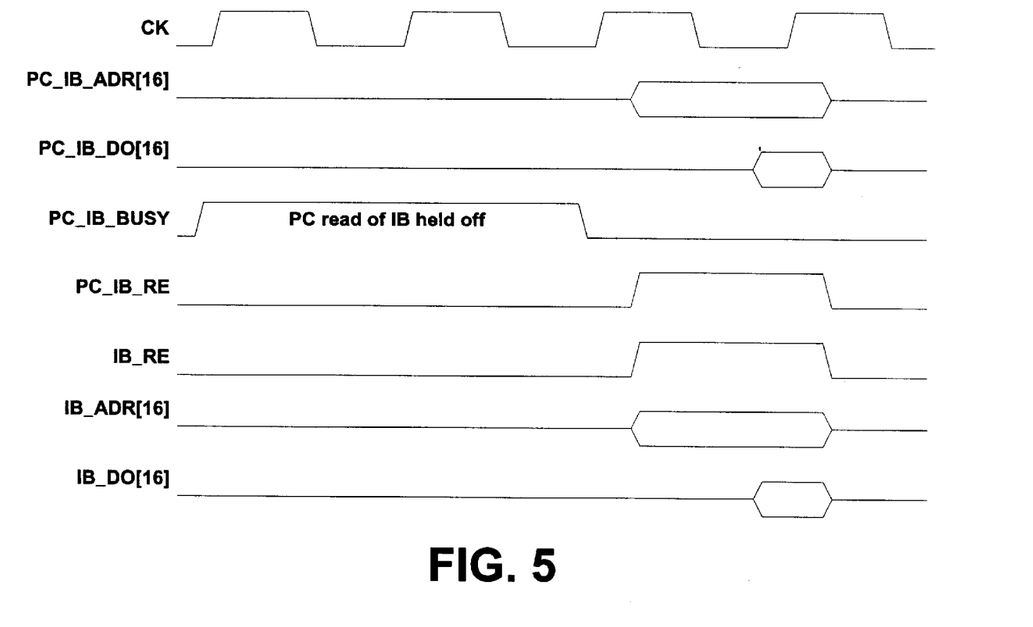
FIG. 5 is a timing diagram showing how the image buffer access prioritizer suspends the print controller when a device of higher priority accesses the image buffer.

Please note the clock signal CK in FIG. 5. All internal operations of the IP 10 are synchronized by an internal clock, and the IBAP 18 is no exception. When any device requests access to the IB 16, that access will not be granted until at least the beginning of the next clock cycle. Thus, if a device is in the process of accessing the IB 16 when another request is made, the current access is completed, even if the new request was made by a device of higher priority. In other words, no XXX_IB_BUSY signal will have an effect until the current access is complete.

Figure 6:
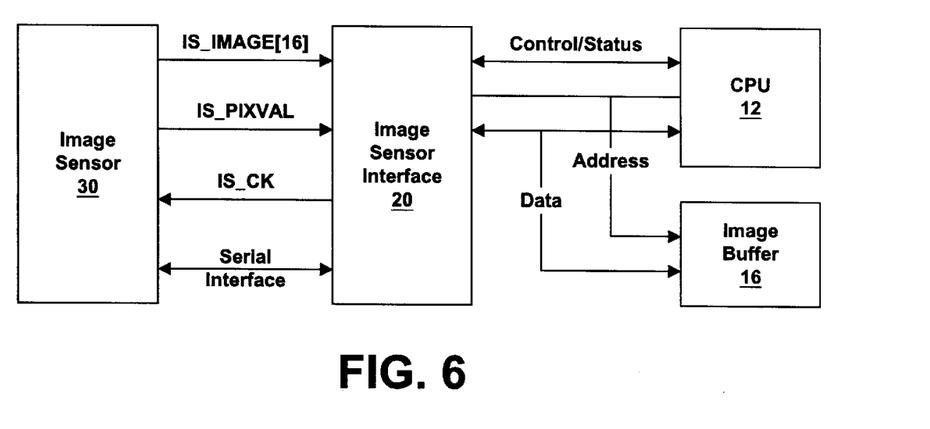
FIG. 6 is a general block diagram of the image sensor interface and adjacent devices.

Referring to FIG. 6, the image sensor data is read from the IS 30 and written into the IB 16 by the ISI 20. Operation of the ISI 20 is controlled by a number of internal ISI hardware registers that are initialized by the CPU 12. These registers are described in detail in Table I.

TABLE I

Control Registers in ISI

| Register Name | Number of Bits | Description |
| --- | --- | --- |
| ISI_IBA_CONTROL | 15 | bit 0 = 1: ISI IB access active, set high by CPU<br>= 0: ISI IB access inactive, set low by image sensor interface<br>bit 1 = 0: Reference image is positive<br>= 1: Reference image is negative<br>bit 2 = 0: Input image is positive<br>= 1: Input image is negative<br>bit 3 = 0: Don't use reference image<br>= 1: Add input image to reference image<br>Note: only one of the input image or reference image may be negative at a time (bits 1 and 2 cannot both be set at the same time)<br>bit 4: Enable IS_CK<br>bit 14:5: Number of pixels read in most recent line<br>Note: All 15 bits set low by RESET |
| ISI_PIX_CONFIG | 14 | bit 9:0: Number of pixels per line (320)<br>bit 13:10: Pixel clock division factor<br>IS_CK = main clock/division factor |
| ISI_IMAGE_ADDR | 16 | IB word address for storage of IS_IMAGE |
| ISI_IMAGE_PAGE_ADDR | 3 | IB page address for storage of IS_IMAGE |
| ISI_REF_ADDR | 16 | IB word address of reference image |
| ISI_REF_PAGE_ADDR | 3 | IB page address of reference image |
| ISI_GPIO | 16 | 13 ISI general purpose outputs (including IS_RESET) and 3 unassigned |

The ISI 20 uses three signals to control the image transfer from the IS 30. IS_IMAGE[11:0] is the 12-bit bus on which pixel data is transferred. As described above, the present implementation uses a 12-bit digital value to represent the analog value from a pixel 42.

IS_CK is a clock output from the ISI 20 to the IS 30. It is generated within the ISI 20 by dividing the master system clock by the value in ISI_PIX_CONFIG[13:10]. In the present implementation, the master clock rate is 50 MHz and the clock division factor is 5. Consequently, IS_CK has a rate of 10 MHz. Since the IS 30 outputs pixel data on succeeding falling edges of IS_CK, the pixel data is transferred from the IS 30 at a rate of $10^7$ pixels/second.

IS_PIXVAL is an output from the IS 30 that, when set high, indicates that valid pixel data will be available at IS_IMAGE on the next falling edge of IS_CK.

Images are read from the IS 30 on a line-by-line basis. Recall that the example IS 30 has a 320×240 pixel array. This translates to 240 lines of 320 pixels per line. Before each line is read, the CPU 12 sets up the IS registers. There are many different ways known in the art to implement the IP-IS interface, including serial, parallel, and hybrid serial/parallel interfaces. In the present implementation, the IS registers are set up by a simple 4-wire serial interface implemented in the GPIO signals from register ISI_GPIO. The timing of the signals is controlled by the CPU 12. The present invention contemplates that any type of interface can be implemented between the IP 10 and IS 30, as long as it is fast enough to set up the IS registers as needed.

The CPU 12 also sets up the ISI registers, an internal function. ISI_PIX_CONFIG[9:0] are set to the number of pixels per line, in this particular implementation, to 320. Bits ISI_PIX_CONFIG[13:10] are set to the clock division factor, in this particular implementation, 5.

The IB 16 has two addressable spaces, the reference space and the image space. In most situations, it is desired to add or subtract a reference value from the actual image. For example, most pixels do not have an absolute zero output when there is no light incident upon it. This is part of what is referred to as noise. Thus, the pixel has an offset that must be taken into account in the image as it is read from the IS 30. Consequently, the present implementation can read a complete image from the IS 30 before exposing the IS 30 to the actual desired image, and stores this noise image into the IB 16. This is then referred to as the reference image and is stored in the reference space. The present invention has the ability to simultaneously retrieve a pixel from the IS 30 and a reference pixel from the IB 16, add them together, and store the result into the IB 16 in the image space. ISI_IBA_CONTROL[3] controls whether or not the addition takes place, as indicated in Table I. The ISI 20 also has the ability to negate either the reference data or the IS 30 data prior to the addition, in effect, performing a subtraction. The negation is controlled by ISI_IBA_CONTROL[2:1]. Note that in the present implementation, only one of the values can be negated for any given line.

Prior to reading a line, ISI_REF_PAGE_ADDR is set to the 128K page in IB 16 where the reference data is located and ISI_REF_ADDR is set to the word address within the IB 16 page where the reference data is located. ISI_IMAGE_PAGE_ADDR is set to the 128K page in IB 16 where the new line data is to be stored and ISI_IMAGE_ADDR is set to the word address within the IB page where the new line data will be stored. Given that the current implementation has a 128 KWord IB, the two most significant bits of ISI_REF_PAGE_ADDR and ISI_IMAGE_PAGE_ADDR are moot for IS data transfers. They are for byte addressing and for future expansion of word addressing.

Paging is used in this implementation merely as a convenience. The currently implemented CPU has a 16-bit processor, so 16-bit arithmetic on the address counters is more easily implemented than 20-bit arithmetic. And as long as a line of data does not cross a page boundary, there are no complications associated with paging. This does not mean that paging is preferred over other addressing scheme. Any addressing scheme that adequately addresses the portion of IB to which the pixel data is to be stored is contemplated.

Note also that, in the current implementation, two complete images will not fit into the IB 16. Thus, some new data will overwrite some reference date. In fact, it is typical that the reference space and the image space will exactly overlap, because there is generally no reason to maintain the reference data after being used to correct the actual image.

After the parameters are set up, the CPU 12 initiates the line read by setting ISI_IBA_CONTROL[0] high. This causes several initializing events to occur: the reference address (ISI REF_PAGE ADDR,ISI_REF ADDR) and image address (ISI_IMAGE_PAGE_ADDR,ISI _IMAGE_ADDR) are copied to autoincrementing registers radr and iadr, respectively, and an autoincrementing pixel counter register, pixctr, is set to 1. Then the CPU 12 sets one of the IS_GPIO signals high to the IS 30 to indicate to the IS 30 that the ISI 20 is ready to accept data. As indicated above, when the IS 30 is ready to send data, it sets IS_PIXVAL high to indicate that the next falling edge of IS_CK will have the first pixel data for the selected line in IS_IMAGE[11:0].

Data is transferred from the IS 30 at a rate of 10 MHz, while the internal clock of the ISI 20 runs at 50 MHz. Thus, there are 5 internal ISI cycles for each pixel data transfer. The first of these internal cycles following the falling edge of IS_CK is cycle 1. At cycle 1, the incoming pixel data is saved in an internal register tp1, the reference data pointed to by radr is read and saved in internal register tp0, and radr is incremented. Note that the pixel data received from the IS 30 is only 12 bits. Since the ISI 20 performs 16-bit arithmetic, the 12 bits are internally padded out to 16 bits before being saved in register tp1. At cycle 2, the appropriate calculation is performed using registers tp0 and tp1 as determined by IS_IBA_CONTROL[3:1]. At cycle 3, the calculation result is written into the IB 16 at the address pointed to by iadr, iadr is incremented, and then the ISI 20 determines if the last pixel data has been received. The last pixel data has been received if the value of pixctr is greater than or equal to the value in ISI_PIX_CONFIG[9:0] or if IS_PIXVAL has been set low by the IS 30. If neither condition is present, pixctr is incremented and the ISI 20 waits for the next falling edge of IS_CK. If either condition is present, the ISI 20 generates an interrupt to the CPU 12 to indicate that the entire line has been received, sets ISI_IBA_CONTROL[0] low, and copies the value of pixctr into ISI_IBA_CONTROL[14:5]. A summary of this process is as follows:

```
At positive edge of ISI_IBA_CONTROL[0]:
    pixctr = 1.
    iadr (ISI_IMAGE_PAGE_ADDR,ISI_IMAGE_ADDR).
    radr = (ISI_REF_PAGE_ADDR,ISI_REF_ADDR).
While ISI_IBA_CONTROL[0] is high, next negative edge of
    IS_CK is cycle 1:
    In cycle 1, do:
        Write incoming pixel data to register tp1.
        Read reference data at address radr to register
            tp0.
        Increment radr by 1.
    In cycle 2, do:
        Perform calculation according to
            ISI_IBA_CONTROL[3:1].
```

-continued

```
In cycle 3, do:
    Write cycle 2 calculation result to address iadr.
    Increment iadr by 1.
    If (pixctr >= ISI_CONFIG[9:0] or IS_PIXVAL is
        low):
        Generate interrupt to CPU.
        Set ISI_IBA_CONTROL[0] low.
        Copy pixctr to ISI_IBA_CONTROL[14:5].
    Else:
        Increment pixctr by 1.
```

One function of the CPU 12 is to provide overall control of the transfer of image data from the IS 30. The process of image acquisition begins when the CPU 12 receives a command that an image is to be acquired. How the CPU 12 received the acquire command is not the subject of the present invention. However, the command may come from one of several different sources. For example, if the IP 10 is part of an electronic camera, the source may be the exposure button depressed by the user that triggers an interrupt to the CPU 12, or it may be a command received via a communication from the camera master controller that, itself, received the exposure button signal.

There are several different processes by which a final image can be acquired. As discussed above, the ISI 20 is capable of adding a reference value from the IB 16 to the received pixel data before being stored in the IB 16. The reference value can come from either the IS 30 as received data or from the CPU 12 by being written to the IB 16. In the first case, the IP 10 acquires two images from the IS 30. The first image, the reference image, is stored in the IB 16 unmodified, that is, ISI_IBA_CONTROL[3] is set to zero. The second image, the desired image, is an image received from the IS 30 that is modified by adding the reference image to the second received image, as instructed by ISI_ IBA_CONTROL[2:1], before being stored in the IB 16.

After receiving the acquire command, the CPU 12 initializes a line counter to 1. The remainder of the acquisition process depends upon whether reference values are used and, if so, whether the reference value is an acquired image or set by the CPU 12.

If no reference values are used, the CPU 12 enters a loop that instructs the ISI 20, at each iteration, to acquire an image line of data. For each line (loop iteration), the CPU 12 sets up the IS and ISI control registers, including setting ISI_IBA_CONTROL[3] low, and then initiates the line data transfer by setting ISI_IBA_CONTROL[0] high. After the ISI 20 has transferred the line of data, it generates an interrupt to the CPU 12. The CPU 12 determines if the ISI 20 has transferred the last line. If it has not, the CPU 12 increments the line counter and loops again to instruct the ISI 20 to acquire the next line. If the last line has been acquired, the CPU 12 drops out of the loop.

If reference values are used and are initialized by the CPU 12, the CPU 12 can initialize the reference values all at once or for each line prior to that line's acquisition. The CPU 12 loops, instructing the ISI 20 to acquire an image line of data. For each line, the CPU 12 sets up the IS and ISI control registers, including setting ISI_IBA_CONTROL[3] high and setting ISI_IBA_CONTROL[2:1] appropriately, and then initiates the line data transfer by setting ISI_IBA_ CONTROL[0] high. After the ISI 20 has transferred and modified the line of data, it generates an interrupt to the CPU 12. The CPU 12 determines if the ISI 20 has transferred the last line. If it has not, the CPU 12 increments the line counter and loops again to instruct the ISI 20 to acquire the next line. If the last line has been acquired, the CPU 12 drops out of the loop.

Finally, if reference values are used and are initialized by an image from the IS 30, the CPU 12 enters a first loop, instructing the ISI 20 to acquire an image line of data. For each line, the CPU 12 sets up the IS and ISI control registers, including setting ISI_IBA_CONTROL[3] low so the line of data merely passes through to the IB 16, and then initiates the line data transfer by setting ISI_IBA_CONTROL[0] high. After the ISI 20 has transferred the line of data, it generates an interrupt to the CPU 12. If the last line has not been received, the CPU 12 increments the line counter and loops again to instruct the ISI 20 to acquire the next line. If the last line has been received, the CPU 12 enters another loop to acquire the actual image. For each line, the CPU 12 sets up the IS and ISI control registers, including setting ISI_IBA_CONTROL[3] high and setting ISI_IBA_CONTROL[2:1] appropriately, and then initiates the line data transfer by setting ISI_IBA_CONTROL[0] high. After the ISI 20 has transferred, modified, and stored the line of data in the IB 16, it generates an interrupt to the CPU 12. If the last line has not been received, the CPU 12 increments the line counter and loops again to instruct the ISI 20 to acquire the next line. If the last line has been received, the CPU 12 drops out of the loop.

Note that, because each image line is acquired independently after being set up by the CPU 12, each line may be treated differently from the previous line. For example, an image line may be modified by reference data from the CPU 12, the next line may be unmodified, and the third line may be modified by reference data from the IS 30.

After the image is acquired, the CPU 12 may perform any additional processing on the image data that it is programmed to do.

Note that only 3 of the 5 internal cycles are used by the ISI 20. The other cycles are used by other functions of the IP 10.

As indicated above, the ISI 20 has the second highest IB access priority, behind the LCDI 24. Each pixel of data must be written to the IB 16 before the next pixel of data is available. Since only 3 of the 5 available internal clock cycles between pixel data points (IS_CK clocks) are needed for the ISI, two cycles are available for the LCDI 24, PC 26, and CPU 12n to access the IB 16. If the LCDI 24 needs access to the IB 16 during one of the 3 cycles of pixel data processing, the pixel data processing is suspended for a cycle, while the LCDI 24 performs its access. Note that the LCDI 24 cannot cause the IBI 20 to suspend for more than two cycles during an IS_CK clock period, or else the ISI processing will fall behind. So the LCDI 24 does have priority over the ISI 20, but only to a point.

Figure 7:
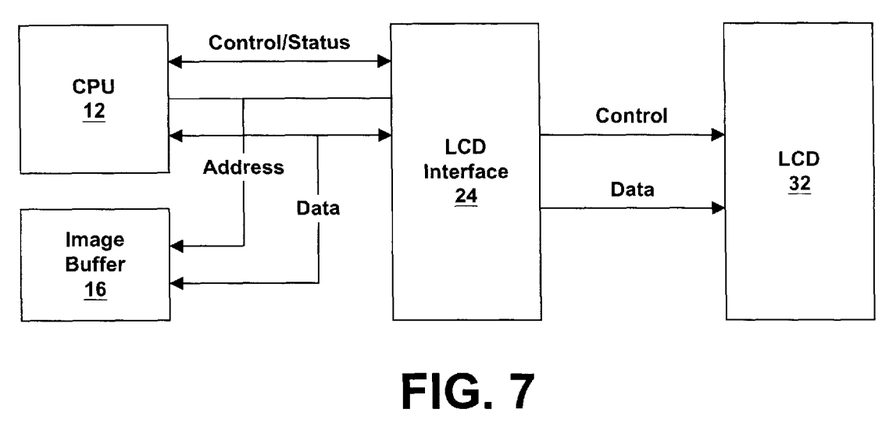
FIG. 7 is a general block diagram of the LCD interface and adjacent devices.

Referring to FIG. 7, the IB 16 is also used as temporary storage for the LCD image data. The image data is generated by the CPU as directed by the firmware. The LCD 32 is controlled by the LCDI 24 component of the IP 10. The LCD image data is assumed by the LCDI 24 to be ready for transfer to the LCD 32. The LCD data organization for the 312 pixel×230 line LCD currently implemented is described in Table II. Each pixel requires 6 bits of information, so each pixel fits into one byte in the IB 16. Since the IB 16 is organized as 16-bit words, each word holds two pixels of data. The low-order six bits of the low-order byte of the word holds the data for left-most of the two pixels. A complete image occupies 35,880 words of the IB 16.

TABLE II

LCD Data Organization in IB

| IB address | Contents of IB word |
|---|---|
| Start address | pixels 0, 1 (left-most) of line 1 (top) |
| address + 1 | pixels 2,3 of line 1 |
| address + 2 | pixels 4,5 of line 1 |
| ... | ... |
| address + 155 | pixels 310,311 (right-most) of line 1 |
| address + 156 | pixels 0,1 of line 2 |
| ... | ... |
| address + 35879 | pixels 310,311 of line 230 (bottom) |

Data is delivered to the LCD 32 at a rate of 6.15 MHz, that is, there is 0.163 µs between each pixel, or 0.325 µs between each word access of the IB 16. Using the 50 MHz system clock and 10 MHz IS clock described above with reference to the ISI 20, the LCDI 24 will access the IB 16, on average, once every 16.25 clock cycles or once every 3.25 image pixel accesses when the ISI 20 is transferring image data from the IS 30 to the IB 16.

Operation of the LCDI 24 is controlled by several internal LCDI hardware registers that are initialized by the CPU. These registers are described in detail in Table III.

TABLE III

Control Registers in LCDI

| Register Name | Number of Bits | Description |
|---|---|---|
| LCDI_IBA_CONTROL | 3 | bit 0 = 1: LCDI IB access active<br>= 0: LCDI IB access inactive<br>bit 2:1: LCD_POW[1:0]<br>Note: All 3 bits set low by RESET |
| LCDI_ADDR | 16 | IB word address of LCD image data |
| LCDI_PAGE_ADDR | 3 | IB page address of LCD image data |

The CPU 12 sets LCDI_PAGE_ADDR to the 128K page in IB 16 where the LCD image data is located and LCDI_ADDR is set to the word address within the IB page where the LCD image data is located. As described above with reference to the ISI 20, given that the current implementation has a 128 KWord IB, the two most significant bits of LCDI_PAGE_ADDR are moot for IS data transfers. They are for byte addressing and for future expansion of word addressing. Note also that since the LCD image uses 35,880 words, the highest address to which (LCDI_PAGE_ADDR,LCDI_ADDR) can be set is 95,192. Any higher address will cause address wrap around.

After the LCDI registers are set up, the CPU 12 initiates the line read by setting LCDI_IBA_CONTROL[0] high. This causes the image address (LCDI_PAGE_ADDR, LCDI_ADDR) to be copied to autoincrementing register lcdadr. Then the LCDI 24 starts reading from the address in lcdadr. A total of 35,880 words are read, and then the LCDI 24 restarts at LCDI_PAGE_ADDR, LCDI_ADDR. The LCDI 24 continues to cycle through the LCD image data until the CPU 12 sets LCDI_IBA_CONTROL[0] low. The LCDI_LCD interface is not the subject of the present invention and is not described here. The details depend upon the LCD 32 being used.

As indicated above, the LCDI 24 is the highest priority IB access device. When displaying visual information, timing is relatively critical. If consistent timing is not maintained, the image will not appear smooth as the image changes. Thus, if the LCDI 24 needs access to the IB 16, it overrides all other devices.

Figure 8:
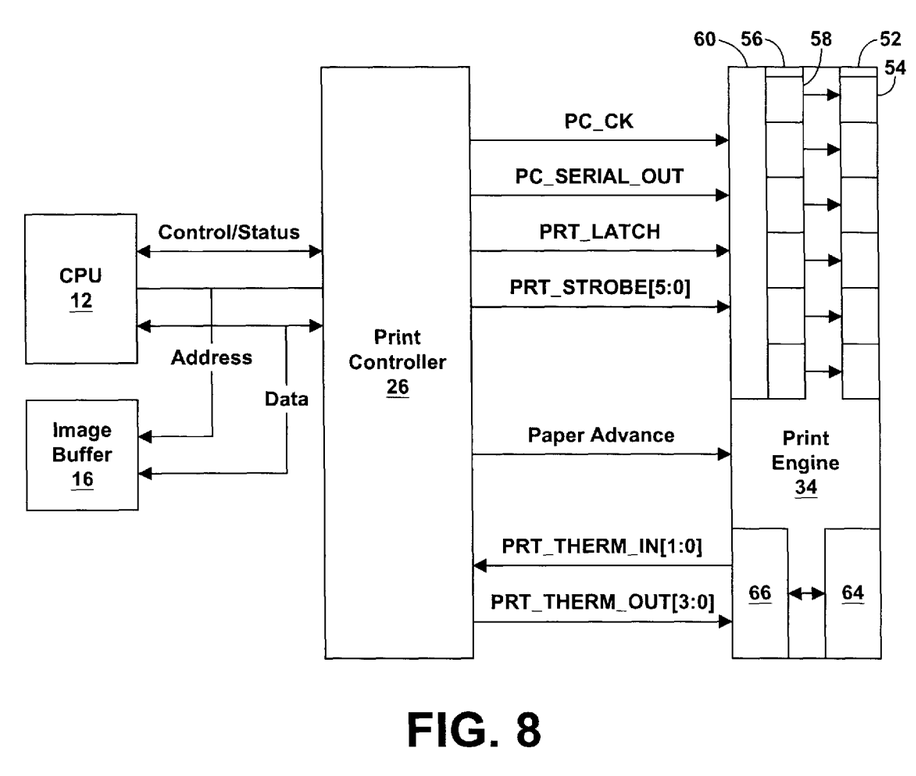
FIG. 8 is a general block diagram of the printer interface and adjacent devices.

Referring to FIG. 8, the IB 16 is also used as temporary storage for the print image data. The present invention uses a thermal print engine 34. A thermal print engine has a row of heating elements 52, one for each pixel of an image row. An image pixel is generated on the paper by heating a spot for a period of time. The length of the heating period determines how dark the spot appears on the white paper. The longer the heating period, the darker the spot is. The current implementation of the invention allocates 8 bits of data for each pixel of the print image. This means that the heating element 52 may be activated for a heating period that has a resolution of $1/256$ of the maximum heating time, where $1/256$ of the maximum heating time is called a slice. For example, if the pixel data is 100, the corresponding heating element 52 will be on for 100 slices or $100/255$ of the maximum heating time. The maximum heating time is dependent upon the paper used, the operating current, and the efficiency of the heating elements. Typically, the maximum heating time can range from about 1 ms to about 100 ms.

The print image data organization for the 384-pixel-per-line print engine 34 currently implemented is described in Table IV. The number of print lines varies depending upon the aspect ratio of the image and the number of pixels desired per vertical inch of paper. A typical number of lines is 576, which will be used in examples for the remainder of this specification.

Since each pixel heating element 52 requires only 8 bits of information, each 16-bit IB word holds data for two pixels. The low-order byte of the word holds the data for left-most of the two pixels. A complete 384 pixel×576 line image occupies 110,592 words of the IB 16.

TABLE IV

Printer Data Organization in IB

| IB address | Contents of IB word |
| --- | --- |
| Address | Pixels 1, 2 (left-most) of line 1 (top) |
| Address + 1 | Pixels 3,4 of line 1 |
| Address + 2 | Pixels 5,6 of line 1 |
| . . . | . . . |
| Address + 191 | Pixels 383, 384 (right-most) of line 1 |
| Address + 192 | Pixels 1,2 of line 2 |
| . . . | . . . |
| Address + 110,591 | Pixels 383, 384 of line 576 (bottom) |

The print engine 34 is controlled by the PC 26 component of the IP 10. The data is generated by the CPU 12 as directed by the firmware and is assumed by the PC 26 to be ready for transfer to the print engine 34 when the PC 26 is started.

Operation of the PC 26 is controlled by several internal PC hardware registers that are initialized or read by the CPU 12. These registers are described in detail in Table V.

TABLE V

Control Registers in PC

| Register Name | Number of Bits | Description |
| --- | --- | --- |
| PC_CONTROL _OUT | 16 | bit 0 = 1: PC IB access active<br>= 0: PC IB access inactive<br>bit 6:1: PRT_STROBE[5:0]<br>bit 7: PRT_LATCH<br>bit 11:8: PRT_THERM_OUT[3:0]<br>bit 15:12: PRT_CNFG_OUT[3:0]<br>Note: All bits set low by RESET |

TABLE V-continued

Control Registers in PC

| Register Name | Number of Bits | Description |
| --- | --- | --- |
| PC_CONTROL _IN | 4 | bit 1:0: PRT_THERM_IN[1:0]<br>bit 3:2: PRT_CNFG_IN[1:0] |
| PRT_HE _THRESHOLD | 8 | threshold value for heating element on period |
| PRT_PIXELS | 11 | number of pixels per IB access loop iteration |
| PRT_CK FACTOR | 5 | output bit rate scale factor<br>bit rate = (main clock)/(2*PRT_CK_ FACTOR) |
| PRT_ADDR | 16 | IB word address of print image data |
| PRT_PAGE _ADDR | 3 | IB page address of print image data |

The PC 26 uses several signals to control the print image data to the print engine 34. PC_SERIAL_OUT is the serial line on which pixel data is transferred to the print engine 34. PC_CK is a clock output from the PC 26 to the print engine 34. It is generated within the PC 26 by doubling the output bit rate scale factor in PRT_CK_FACTOR and dividing the master system clock by the doubled value. In the present implementation, the master clock frequency is 50 MHz and PRT_CK_FACTOR is 2. Consequently, PC_CK has a frequency of 12.5 MHz. Data on PC_SERIAL_OUT is valid on the rising edge of PC_CK.

The heating elements are driven by latches 56, one for each heating element 52. As currently implemented, the latches 56 are organized into 6 sets 58 of 64 latches. The latches 56 are set from a 384-bit-long shift register 60, the input of which is PC_SERIAL_OUT clocked by PC_CK. After the 384 bits are written into the shift register 60, they are stored in the latches 56 by toggling PRT_LATCH. As the latch outputs stabilize, the set 54 of heating elements 52 corresponding to the set of latches 56 are strobed by setting the appropriate bit of PRT_STROBE[5:0] for the duration of a heating time slice.

The process by which the PC 26 determines how long a heating element 52 is to remain on is an iterative process. Each pixel data is compared 256 times to a threshold value, the value in register PRT_HE_THRESHOLD, that starts at 0 and increments after each comparison. If the pixel data is greater than the threshold value, the corresponding latch 56 is set high. Otherwise the latch 56 is set low. If, for example, the pixel data contains 115, the latch 56 will be high for 115 iterations and then low for 141 iterations, and the corresponding heating element 52 will be on for $115/256$ of the maximum heating time.

One aspect of the present invention is the power-saving manner in which the heating elements 52 are activated. The heating elements 52 require a relatively large surge of power when first applied, which is a detrimental to the small batteries typically used in an electronic camera. consequently, each 64-pixel set 54, 58 goes through the complete 256-level threshold comparison before the next 64-pixel set. Thus, a maximum of 64 heating elements 52 are activated at one time, greatly reducing the power surge on the batteries.

To start the print process, the CPU 12 writes the bit rate factor into PRT_CK_FACTOR and commands the print engine 34 to position the paper to the first line. The manner in which the CPU 12 commands the print engine 34 to advance paper depends on the print engine 34. The input signals to the print engine 34 to advance the paper are driven by some or all of the configurable outputs PRT_CNFG_OUT[3:0]. After the print engine 34 is commanded to advance the paper to the first line, the CPU 12 enters a loop that iterates once for each print line. For each iteration of the print line loop, the CPU 12 executes a loop that iterates 6 times, once for each 64-pixel set 54, 58, as described above. At the beginning of each pixel set loop, the CPU 12 sets PRT_PIXELS to the number of pixels to be output in this loop. For a 64-pixel set, PRT_LINE is set to 64. PRT_PAGE_ADDR to the 128K page in IB 16 where the pixel set data is located and PRT_ADDR is set to the word address within the IB page where the pixel set data is located. Again, as described above with reference to the ISI 20 and LCDI 24, given that the current implementation has a 128 KWord IB, the two most significant bits of PCT_PAGE_ADDR are moot. They are for byte addressing and for future expansion of word addressing. The CPU 12 then sets the heating element threshold value, PRT_HE_THRESHOLD, to 0, and enters a loop that iterates 256 times, once for each heating element threshold value. The CPU 12 sets PC_CONTROL_OUT[0] high to start the PC IB access process. This causes two initializing events to occur: the IB address of the print line data (PRT_PAGE_ADDR,PRT_ADDR) is copied to autoincrementing register padr and an autoincrementing pixel counter register, pixctr, is set to 0. Then the PC 26 reads each pixel set data. Since the IB 16 is 16 bits wide, each IB read will actually retrieve two pixels, where the low-order byte has the first, or left-most, pixel, and the high-order byte has the second, or right-most, pixel. The left pixel data is compared to the threshold value as described above, and the resulting 1 or 0 is clocked into the shift register 60. Then the right pixel data is compared to the threshold value, and the resulting 1 or 0 is clocked into the shift register 60. After both pixels, pixctr is incremented by 2. If it is not at the end of the pixel set, that is, pixctr is less than PRT_PIXELS, padr is incremented and the next IB word is retrieved and each byte is compared. When the pixel set is complete, the shift register output is moved into the latches 56 using PRT_LATCH. Then appropriate bit of PRT_STROBE[5:0] is strobed to turn on the heating elements 52 of the pixel set 54 being operated. Only those heating elements 52 in which the corresponding latch 56 is high actually turns on. After the strobe, the PC 24 generates an interrupt to the CPU 12. The CPU 12 determines if the pixel set loop has iterated 256 times. If not, the CPU 12 increments PRT_HE_THRESHOLD by 1 and restarts the PC IB access process. If the pixel set loop is complete, the CPU 12 determines if the print line loop is complete. If not, the CPU 12 sets (PRT PAGE_ADDR, PRT_ADDR) to the IB address of the next pixel set data and returns to run the pixel set loop again for the next pixel set. If the print line is complete, the CPU 12 sets (PRT_PAGE_ADDR,PRT_ADDR) to the IB address of the first pixel set data of the next print line, commands the print engine 34 to advance the paper to the next line, and returns to run the print line loop again for the next print line. If the print line loop is complete, the CPU 12 commands the print engine 34 to eject the paper and exits the print process. A summary of this process is as follows:

```
CPU writes bit rate factor to PRT_CK_FACTOR.
CPU commands print engine to top of paper.
Loop for each print line:
   Loop for each set of 64 pixels:
      CPU sets (PRT_PAGE_ADDR,PRT_ADDR) for next set of
         64 pixels.
      CPU sets PRT_HE_THRESHOLD to 0.
      Loop 256 times:
         CPU sets PC_CONTROL_OUT[0] high.
         At positive edge of PC_CONTROL_OUT[0]:
            padr = (PRT_PAGE_ADDR,PRT_ADDR).
            pixctr = 0.
            PRT_PIXELS = 64.
         Loop until pixctr >= PRT_PIXELS:
            Read data for two pixels at address padr.
            If (first pixel data > PRT_HE_THRESHOLD):
               Set PC_SERIAL_OUT high.
            Else:
               Set PC_SERIAL_OUT low.
            Toggle PC_CK.
            If (second pixel data > PRT_HE_THRESHOLD):
               Set PC_SERIAL_OUT high.
            Else:
               Set PC_SERIAL_OUT low.
            Toggle PC_CK.
            Increment pixctr by 2.
            Increment padr.
         Toggle PRT_LATCH.
         Toggle appropriate PRT_STROBE[5:0].
         Set PC_CONTROL_OUT[0] low.
         Increment PRT_HE_THRESHOLD.
      Generate interrupt to CPU.
   CPU commands paper advance to next line.
CPU commands paper eject.
```

One aspect of a thermal print engine is that, with prolonged operation, the heating element housing 62 heats up to the point that it affects the operation of the heating elements 52. As the housing 62 gets hotter, the heating element 52 must be on for a shorter period of time to achieve the same paper spot brightness. So that the CPU 12 can determine the temperature of the housing 62, the print engine 34 includes a thermistor 64 and a simple 2-bit analog-to-digital converter 66. The effect of the housing temperature is very coarse, hence only two bits of resolution are needed. At regular intervals during the print process, the CPU 12 samples the housing temperature by reading PRT_THERM_IN[1:0]. If the housing 62 has heated to the point that adjustment is needed, the CPU 12 corrects all of the pixel data for the lines that have not yet been printed. Since the effect is gradual, the correction typically consists of decrementing each pixel data value by one.

Thus it has been shown and described an image processor with an integral image buffer and print controller which satisfies the objects set forth above.

Since certain changes may be made in the present disclosure without departing from the scope of the present invention, it is intended that all matter described in the foregoing specification and shown in the accompanying drawings be interpreted as illustrative and not in a limiting sense.

What is claimed is:

1. An image processor microcircuit adapted for use in an imaging processing system having an image sensor with P pixels and a digital output whereby each pixel is represented by N bits, said image processor microcircuit comprising:
   (a) an image buffer having at least P memory locations of at least N bits and having input signals including an address bus, a read enable, and a write enable;
   (b) a plurality of devices capable of accessing said image buffer by using image buffer access signals;
   (c) an image buffer access prioritizer controlling access to said image buffer by said devices, each of said devices having an access priority fixed relative each other;

(d) a first of said devices being a central processing unit, said central processing unit image buffer access signals including output control signals and an input busy signal, said busy signal causing said central processing unit to suspend image buffer accesses when asserted;

(e) a second of said devices being an image sensor interface, said image sensor interface image buffer access signals including output control signals;

(f) said prioritizer receiving and monitoring said central processing unit output control signals and said image sensor interface output control signals;

(g) said prioritizer, when said image sensor interface attempts to access said image buffer, asserting said central processing unit busy signal and allowing said image sensor interface image buffer access signals to control said image buffer input signals; and (h) said prioritizer deasserting said central processing unit busy signal when said image sensor interface completes access to said image buffer.

2. The image processor microcircuit of claim 1 wherein, when said central processing unit busy signal input is asserted while said central processing unit is accessing said image buffer, said central processing unit busy signal input has no effect until said central processing unit access is complete.

3. The image processor microcircuit of claim 1 further comprising:

(a) a third of said devices being a display interface, said display interface image buffer access signals including output control signals;

(b) said image sensor interface image buffer access signals including an input busy signal, said busy signal causing said image sensor interface to suspend image buffer accesses when asserted;

(c) said prioritizer receiving and monitoring said display interface output control signals;

(d) said prioritizer, when said display interface attempts to access said image buffer, asserting said central processing unit busy signal and said image sensor interface busy signal and allowing said display interface image buffer access signals to control said image buffer input signals; and (e) said prioritizer deasserting said central processing unit busy signal and said image sensor interface busy signal when said display interface completes access to said image buffer.

4. The image processor microcircuit of claim 1 wherein said image processor includes an internal clock with a clock cycle, said image sensor interface reading image data for one pixel from said image sensor once every fifth internal clock and using three internal clock cycles to process and store said one pixel of image data, leaving two internal clock cycles during said image sensor interface pixel data read for other of said devices to access said image buffer.

* * * * *